(12) United States Patent
Kobayashi et al.

(10) Patent No.: US 10,054,138 B2
(45) Date of Patent: Aug. 21, 2018

(54) DEVICE MOUNTING STRUCTURE

(71) Applicant: KYB-YS CO., LTD., Nagano (JP)

(72) Inventors: Nobuyuki Kobayashi, Nagano (JP); Shinji Satou, Nagano (JP)

(73) Assignee: KYB-YS Co., Ltd., Nagano (JP)

( * ) Notice: Subject to any disclaimer, the term of this patent is extended or adjusted under 35 U.S.C. 154(b) by 0 days.

(21) Appl. No.: 15/525,606

(22) PCT Filed: Oct. 28, 2015

(86) PCT No.: PCT/JP2015/080336
§ 371 (c)(1),
(2) Date: May 10, 2017

(87) PCT Pub. No.: WO2016/076110
PCT Pub. Date: May 19, 2016

(65) Prior Publication Data
US 2017/0321730 A1 Nov. 9, 2017

(30) Foreign Application Priority Data
Nov. 14, 2014 (JP) .................................. 2014-231921

(51) Int. Cl.
*F15B 15/20* (2006.01)
*F15B 15/14* (2006.01)
(Continued)

(52) U.S. Cl.
CPC ............ *F15B 15/149* (2013.01); *E02F 9/226* (2013.01); *F15B 13/0433* (2013.01);
(Continued)

(58) Field of Classification Search
CPC ..... B60G 17/04; A01B 63/1006; A01B 63/32; F16F 9/325; F16F 9/3257; F16F 9/5123
See application file for complete search history.

(56) References Cited

U.S. PATENT DOCUMENTS 2,362,578 A * 11/1944 Mott ..................... A01L 363/10
172/295
3,251,422 A * 5/1966 Allgaier ............ A01L 363/1006
172/3
(Continued)

FOREIGN PATENT DOCUMENTS

EP 2077356 A1 7/2009
JP H03-243440 A 10/1991
(Continued)

*Primary Examiner* — Bradley Duckworth
(74) *Attorney, Agent, or Firm* — Rabin & Berdo, P.C.

(57) ABSTRACT

A device mounting structure for mounting a load maintaining mechanism on a hydraulic cylinder, a pipe for suppling and discharging working oil to and from the hydraulic cylinder being connected to the load maintaining mechanism such that the working oil is led thereto, includes a single coupling portion that includes a screw hole and is provided on the hydraulic cylinder, and a bracket to which the load maintaining mechanism is fixed, the bracket being coupled to the coupling portion via a first screw member that is screwed into the screw hole, wherein the bracket includes a first through hole through which the first screw member is passed so as to leave a gap in a radial direction.

6 Claims, 8 Drawing Sheets

(51) Int. Cl.
  *E02F 9/22* (2006.01)
  *F15B 13/043* (2006.01)
  *F16B 9/02* (2006.01)
  *F16B 5/02* (2006.01)
  *F16F 9/32* (2006.01)
  *F16F 9/54* (2006.01)

(52) U.S. Cl.
  CPC ............ *F16B 5/0225* (2013.01); *F16B 9/026* (2013.01); *F16F 9/3228* (2013.01); *F16F 9/54* (2013.01)

(56) References Cited

U.S. PATENT DOCUMENTS

| | | | | |
|---|---|---|---|---|
| 3,999,784 | A * | 12/1976 | Kennedy, Jr. | E02F 9/2271 285/62 |
| 4,265,063 | A * | 5/1981 | Muller | B66C 13/12 137/377 |
| 4,304,077 | A * | 12/1981 | Muller | E02F 3/36 248/68.1 |
| 4,651,977 | A * | 3/1987 | Buma | F16F 9/466 188/266.2 |
| 4,750,756 | A * | 6/1988 | Voorhies | B60G 17/04 267/64.11 |
| 5,431,259 | A * | 7/1995 | Mizutani | B60G 17/08 188/266.4 |
| 5,649,611 | A * | 7/1997 | Nakadate | B60G 17/08 188/266.6 |
| 6,053,257 | A * | 4/2000 | Sugiyama | A01B 63/1006 172/316 |
| 6,427,986 | B1 * | 8/2002 | Sakai | B60G 15/14 188/266.6 |
| 6,684,990 | B2 * | 2/2004 | Takakusaki | F16F 9/062 188/313 |
| 8,047,340 | B2 * | 11/2011 | Abe | B60G 15/14 188/266.6 |
| 8,523,120 | B2 * | 9/2013 | Asano | F16L 3/2235 248/637 |
| 9,469,964 | B2 * | 10/2016 | Nakamura | E02F 3/302 |
| 9,551,363 | B2 * | 1/2017 | Inoue | B60T 7/042 |
| 2005/0056500 | A1 * | 3/2005 | Garrison | F16F 9/325 188/282.2 |
| 2011/0030353 | A1 * | 2/2011 | Kamiya | B01D 46/0063 60/297 |
| 2012/0097468 | A1 * | 4/2012 | Takeda | E02F 9/2275 180/311 |
| 2014/0003901 | A1 * | 1/2014 | Takagi | E02F 3/30 414/687 |
| 2014/0252179 | A1 * | 9/2014 | Go | E02F 9/2275 248/74.1 |
| 2016/0207472 | A1 * | 7/2016 | Marstall | B60R 11/00 |

FOREIGN PATENT DOCUMENTS

| | | |
|---|---|---|
| JP | H04-004334 A | 1/1992 |
| JP | H04-193642 A | 7/1992 |
| JP | 2002-325331 A | 11/2002 |
| JP | 2006-028744 A | 2/2006 |

* cited by examiner

DEVICE MOUNTING STRUCTURE

TECHNICAL FIELD

The present invention relates to a device mounting structure for mounting an auxiliary device on a fluid pressure cylinder.

BACKGROUND ART

JP2006-28744A discloses a device mounting structure with which a pipe rupture control valve having an input/output port is mounted on a side face of a hydraulic cylinder via a bracket. The input/output port of the pipe rupture control valve disclosed in JP2006-28744A is connected to the hydraulic cylinder through a pipe.

SUMMARY OF INVENTION

When a port of an auxiliary device mounted on a hydraulic cylinder and an iron pipe formed in advance in a predetermined shape so as to extend from the hydraulic cylinder are connected to each other, as in the device mounting structure disclosed in JP2006-28744A, a position of the port of the auxiliary device and a position of the pipe may deviate from each other. When positional deviation occurs between the port of the auxiliary device and the pipe, the connection between the port of the auxiliary device and the pipe may be imperfect, and as a result, oil may leak from the connection part.

To prevent this oil leakage, the auxiliary device and the pipe may be connected after positioning the auxiliary device relative to the pipe by moving the auxiliary device in an axial direction of the fluid pressure cylinder or an orthogonal direction to the axis. To move the auxiliary device, the auxiliary device and the fluid pressure cylinder may be coupled using a combination of a plurality of brackets respectively having elongated holes, for example. In this case, a position in which the auxiliary device and the bracket are bolted to each other and a position in which the plurality of brackets are bolted to each other can be adjusted using the elongated holes, and therefore the respective positions of the auxiliary device and the pipe can be aligned by moving the auxiliary device.

However, when a plurality of brackets are combined, a number of components increases, leading to an increase in a number of adjustment locations, and as a result, a large number of processes and a large amount of time are required to align the respective positions of the auxiliary device and the pipe.

An object of the present invention is to improve the workability of a mounting operation performed using a device mounting structure.

According to one aspect of the present invention, a device mounting structure for mounting an auxiliary device on a fluid pressure cylinder, a pipe for suppling and discharging a working fluid to and from the fluid pressure cylinder being connected to the auxiliary device, includes a single coupling portion that includes a screw hole and is provided on the fluid pressure cylinder; and a bracket to which the auxiliary device is fixed, the bracket being coupled to the coupling portion via a first screw member that is screwed into the screw hole. The bracket includes a first through hole through which the first screw member is passed so as to leave a gap in a radial direction.

DESCRIPTION OF EMBODIMENTS

A device mounting structure 100 according to an embodiment of the present invention will be described below with reference to the figures.

Figure 1:
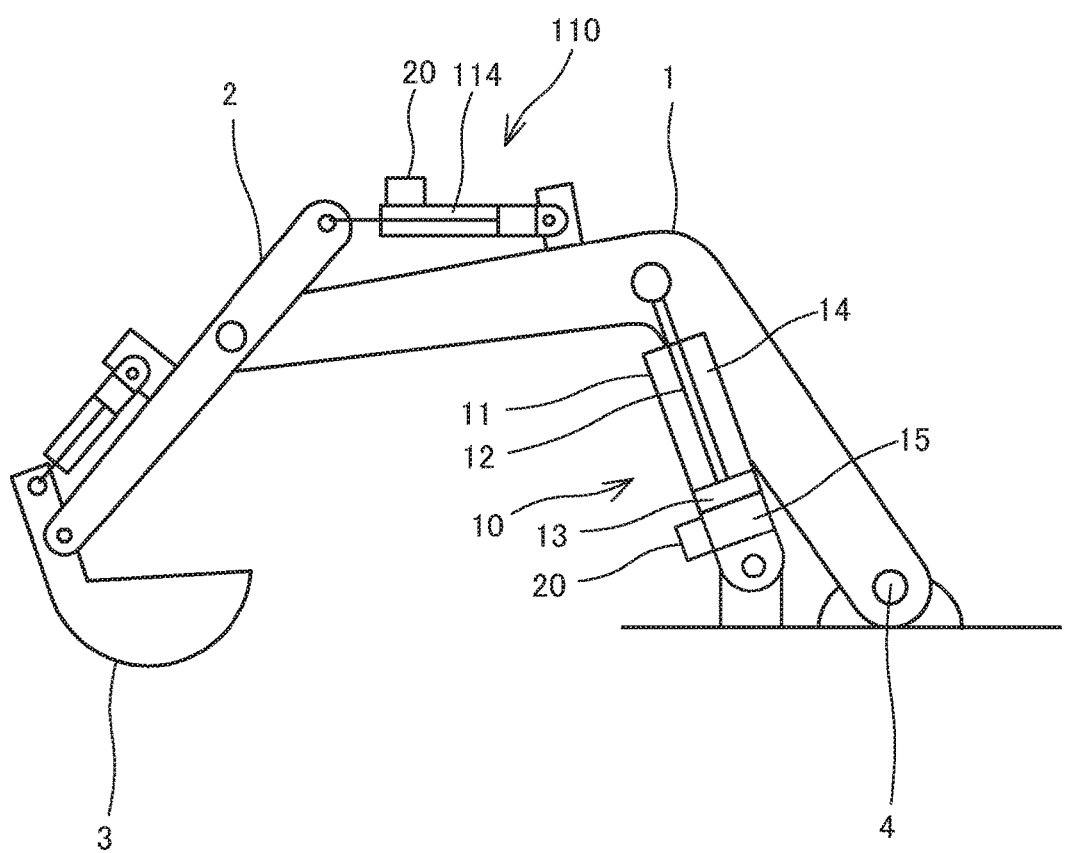
FIG. 1 is a view showing a part of a hydraulic shovel.

The device mounting structure 100 is used to mount an auxiliary device on a fluid pressure cylinder, wherein a pipe for supplying and discharging working fluid to and from the hydraulic cylinder is connected to the auxiliary device. As shown in FIG. 1, a case in which the fluid pressure cylinder is a hydraulic cylinder 10 that drives a boom (a load) 1 of a hydraulic shovel using working oil as the working fluid and the auxiliary device is a load maintaining mechanism 20 for maintaining a load pressure exerted on the hydraulic cylinder 10 will be described below. The working fluid is not limited to working oil, and may be a different incompressible fluid or a compressible fluid.

First, referring to FIGS. 1 and 2, respective configurations of the hydraulic cylinder 10 and the load maintaining mechanism 20 provided in the hydraulic shovel will be described.

The hydraulic cylinder 10 includes a cylindrical cylinder 11, a piston rod 12 inserted into the cylinder 11, and a piston 13 provided on an end portion of the piston rod 12 so as to slide along an inner peripheral surface of the cylinder 11.

The interior of the cylinder 11 is partitioned by the piston 13 into a rod side chamber 14 and an anti-rod side chamber 15. The working oil is supplied to and discharged from the rod side chamber 14 and the anti-rod side chamber 15 respectively through a first port (not shown) and a second port 16 (see FIG. 2) serving as input/output ports.

An engine is installed in the hydraulic shovel, and a pump and a pilot pump serving as oil pressure supply sources are driven by power from the engine.

The working oil discharged from the pump is supplied to the hydraulic cylinder 10 through a control valve (not shown). The control valve is switched by pilot pressure led thereto from the pilot pump. The control valve has a first position in which the working oil discharged from the pump is supplied to the anti-rod side chamber 15 and working oil in the rod side chamber 14 is discharged into a tank, and a second position in which the working oil discharged from the pump is supplied to the rod side chamber 14 and working oil in the anti-rod side chamber 15 is discharged into the tank. When the pilot pressure is not led to the control valve, the control valve is switched to a shut-off position in which supply and discharge of the working oil to and from the hydraulic cylinder 10 is shut off.

The hydraulic cylinder 10 is configured such that when the control valve is switched to the first position, whereby working oil is supplied to the anti-rod side chamber 15 through the second port 16 and working oil is discharged from the rod side chamber 14 through the first port, the piston rod 12 performs an extension operation. When the piston rod 12 performs an extension operation, the boom 1 rotates upward about a shaft 4.

Further, the hydraulic cylinder 10 is configured such that when the control valve is switched to the second position, whereby working oil is supplied to the rod side chamber 14 through the first port and working oil is discharged from the anti-rod side chamber 15 through the second port 16, the piston rod 12 performs a contraction operation. When the piston rod 12 performs a contraction operation, the boom 1 rotates downward about the shaft 4.

When the control valve is switched to the shut-off position such that supply and discharge of the working oil to and from the hydraulic cylinder 10 is shut off, the boom 1 is maintained in a stopped condition.

Here, when the control valve is switched to the shut-off position so that the boom 1 stops moving in a condition where a bucket 3 is raised, as shown in FIG. 1, force is exerted on the hydraulic cylinder 10 in a contraction direction by the weight of the bucket 3, an arm 2, the boom 1, and so on. Hence, in the hydraulic cylinder 10 for driving the boom 1, the anti-rod side chamber 15 serves as a load side pressure chamber on which a load pressure generated by a load is exerted.

Figure 2:
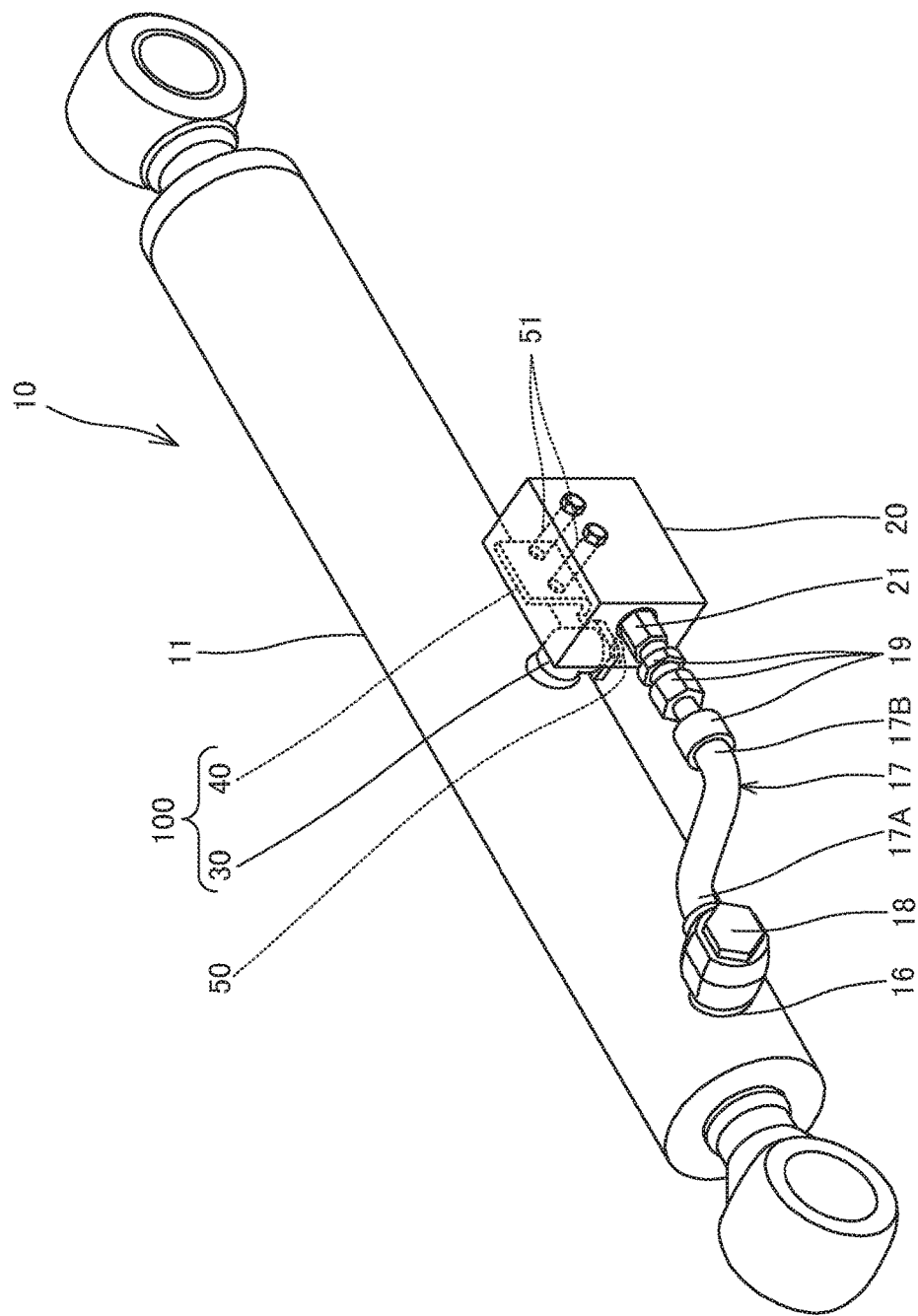
FIG. 2 is a perspective view of a hydraulic cylinder, showing a device mounting structure according to an embodiment of the present invention.

As shown in FIG. 2, the load maintaining mechanism 20 is interposed in a pipe 17 through which the working oil is led, a first end 17A of the pipe 17 being connected via a joint 18 to the second port 16 of the anti-rod side chamber 15 on the load side. The pipe 17 is an iron pipe. The pipe 17 has a second end 17B of which is connected via a joint 19 to a connection port 21 of the load maintaining mechanism 20. A central axis of the second end 17B of the pipe 17 is set to be substantially parallel to a central axis of the cylinder 11.

The load maintaining mechanism 20 includes an operation check valve interposed in the pipe 17 in order to open and close the pipe 17, and a switch valve that operates in conjunction with the control valve in order to switch an operation of the operation check valve.

When the control valve is in the shut-off position, the pipe 17 is closed by the operation check valve, whereby the load maintaining mechanism 20 functions as a check valve for shutting off a flow of working fluid from the anti-rod side chamber 15 to the control valve. In other words, the load maintaining mechanism 20 maintains the load pressure by preventing the working oil from leaking into the anti-rod side chamber 15, and in so doing maintains the boom 1 in the stopped condition.

It should be noted that in a cylinder 110 for driving the arm 2, as shown in FIG. 1, a rod side chamber 114 serves as the load side pressure chamber. Therefore, when the load maintaining mechanism 20 is provided on the arm 2, the load maintaining mechanism 20 is interposed in a pipe connected to the rod side chamber 114.

Next, referring to FIGS. 2 to 8, the device mounting structure 100 for mounting the load maintaining mechanism 20 on the cylinder 11 of the hydraulic cylinder 10 will be described in detail.

As shown in FIG. 2, the device mounting structure 100 is configured to include a single coupling portion 30 that is provided on the cylinder 11 of the hydraulic cylinder 10 and includes a screw hole 32 (see FIGS. 3 and 4), and a bracket 42 to which the load maintaining mechanism 20 is fixed, the bracket 40 being coupled to the coupling portion 30 via a first screw member 50 screwed into the screw hole 32.

Figure 3:
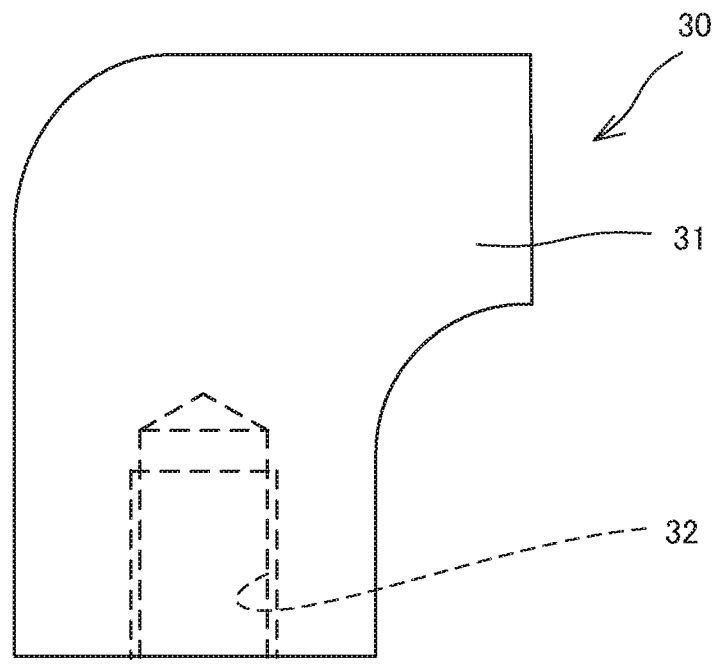
FIG. 3 is a side view of a coupling portion of the device mounting structure according to this embodiment of the present invention.
Figure 4:
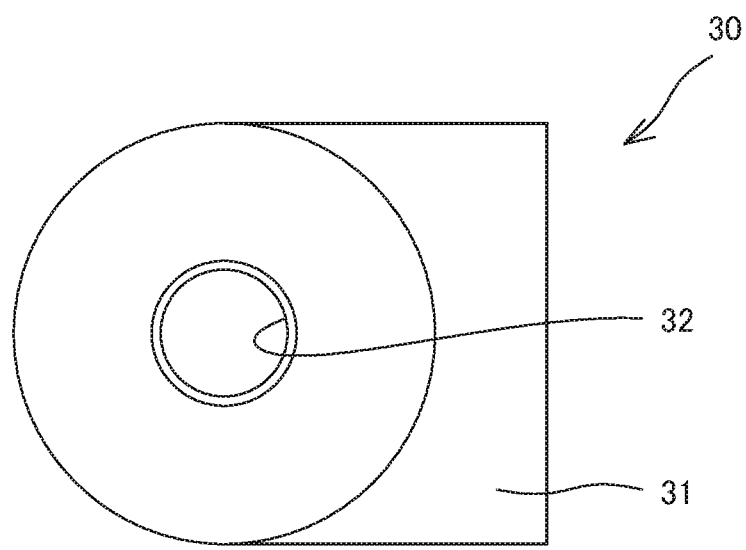
FIG. 4 is a bottom view of the coupling portion of the device mounting structure according to this embodiment of the present invention.

As shown in FIGS. 2 to 4, the coupling portion 30 is an L-shaped member. One end portion 31 of the coupling portion 30 is fixed by welding to an outer peripheral surface of the cylinder 11, and the screw hole 32 is formed in the other end portion so as to open onto an end surface thereof. The coupling portion 30 is fixed to the outer peripheral surface of the cylinder 11 so that a central axis of the screw hole 32 extends in a radial direction of the cylinder 11.

Figure 5:
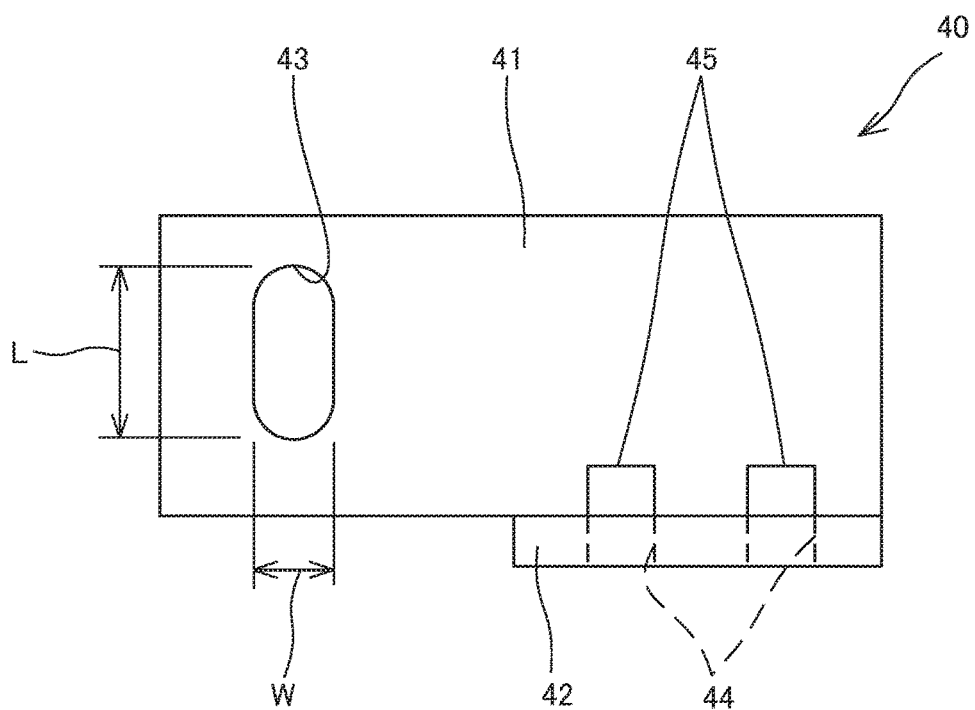
FIG. 5 is a plan view of a bracket of the device mounting structure according to this embodiment of the present invention.
Figure 6:
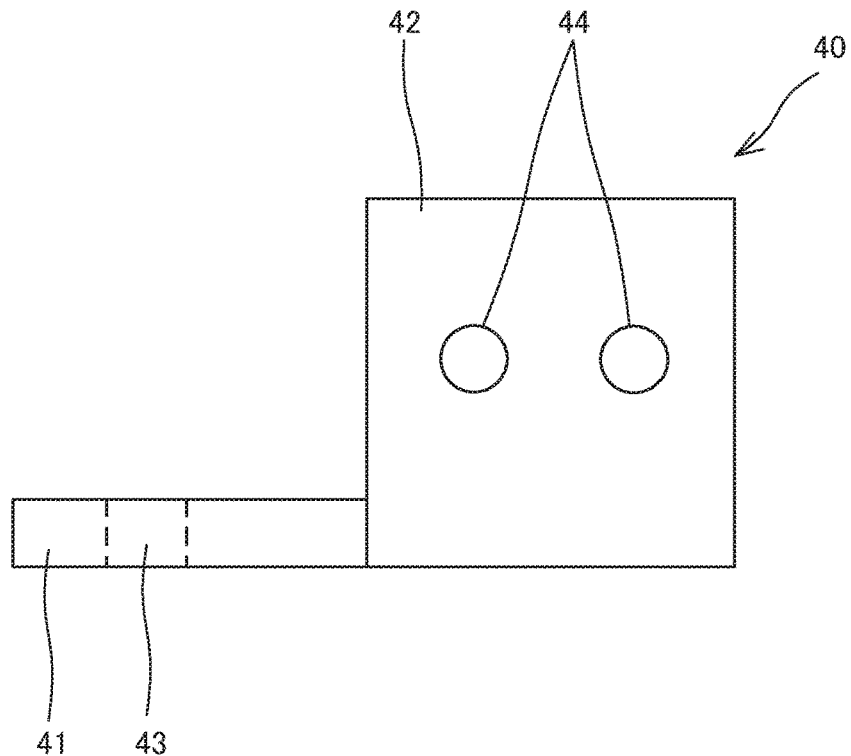
FIG. 6 is a front view of the bracket of the device mounting structure according to this embodiment of the present invention.

As shown in FIGS. 5 and 6, the bracket 40 includes a flat plate-shaped first connecting portion 41, and a flat plate-shaped second connecting portion 42 to which the load maintaining mechanism 20 is fixed, the second connecting portion 42 being provided substantially at a right angle to the first connecting portion 41. The first connecting portion 41 and the second connecting portion 42 are formed integrally by bending a single flat plate by means of pressing, for example.

A single first through hole 43 is formed in the first connecting portion 41 so as to penetrate the first connecting portion 41 in a thickness direction thereof. The first screw member 50 (see FIG. 7) that is screwed into the screw hole 32 in the coupling portion 30 is passed through the first through hole 43. The first through hole 43 is an elongated hole extending in a perpendicular direction to the second connecting portion 42. In other words, the first through hole 43 is formed to extend in the radial direction of the cylinder 11.

A length L of the first through hole 43 is formed to be greater than an outer diameter of the first screw member 50. A width W of the first through hole 43 is formed to be greater than the outer diameter of the first screw member 50. Therefore, the first screw member 50 penetrates the first through hole 43 so as to leave a gap in the radial direction. Hence, in a condition (to be referred to hereafter as a "provisional fastening condition") where the first screw member 50 is passed through the first through hole 43 and screwed into the screw hole 32 but the bracket 40 and the coupling portion 30 are not fully fastened, the bracket 40 can be moved in a length direction and a width direction of the first through hole 43. More specifically, in the provisional fastening condition, the bracket 40 can be moved by an amount corresponding to a gap between the first screw member 50 and the first through hole 43, or in other words an amount corresponding to a gap in the length direction of the elongated hole and a gap in the width direction of the elongated hole.

Further, the first screw member 50 is passed through the first through hole 43 so as to leave a gap in the radial direction, and therefore, in the provisional fastening condition, the bracket 40 can be rotated about the first screw member 50.

Figure 7:
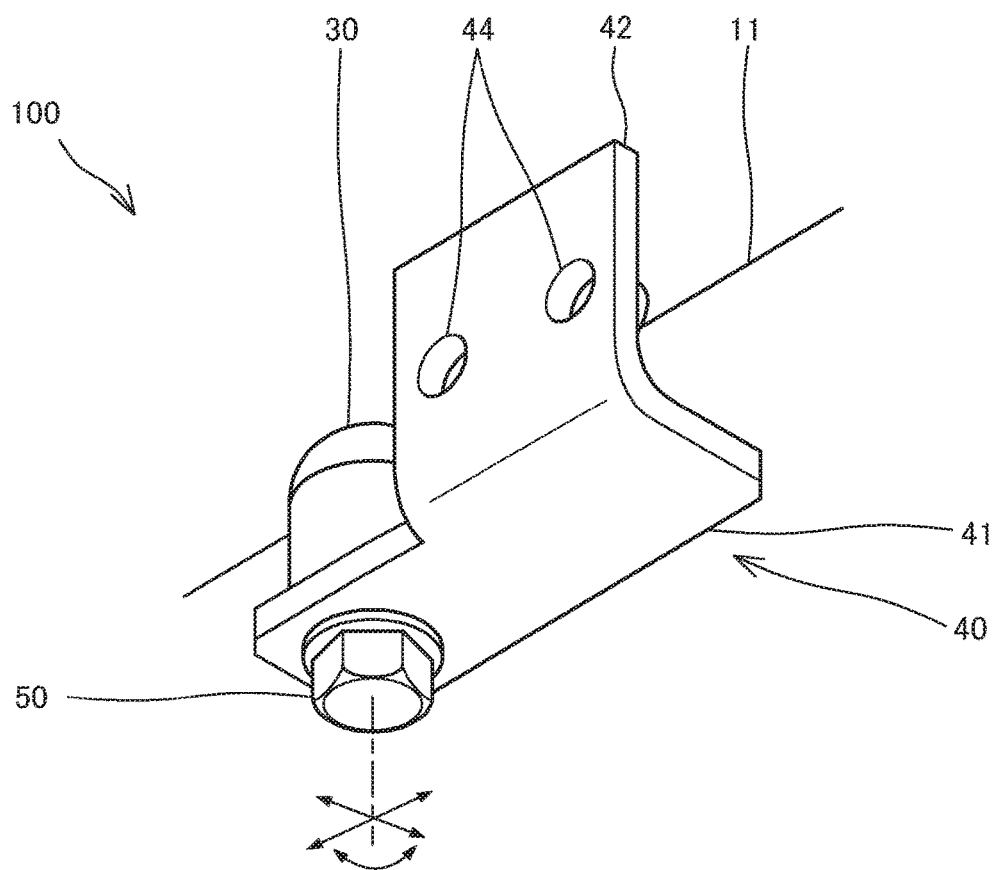
FIG. 7 is a perspective view showing a condition in which the coupling portion and the bracket of the device mounting structure according to this embodiment of the present invention are coupled to each other.
Figure 8:
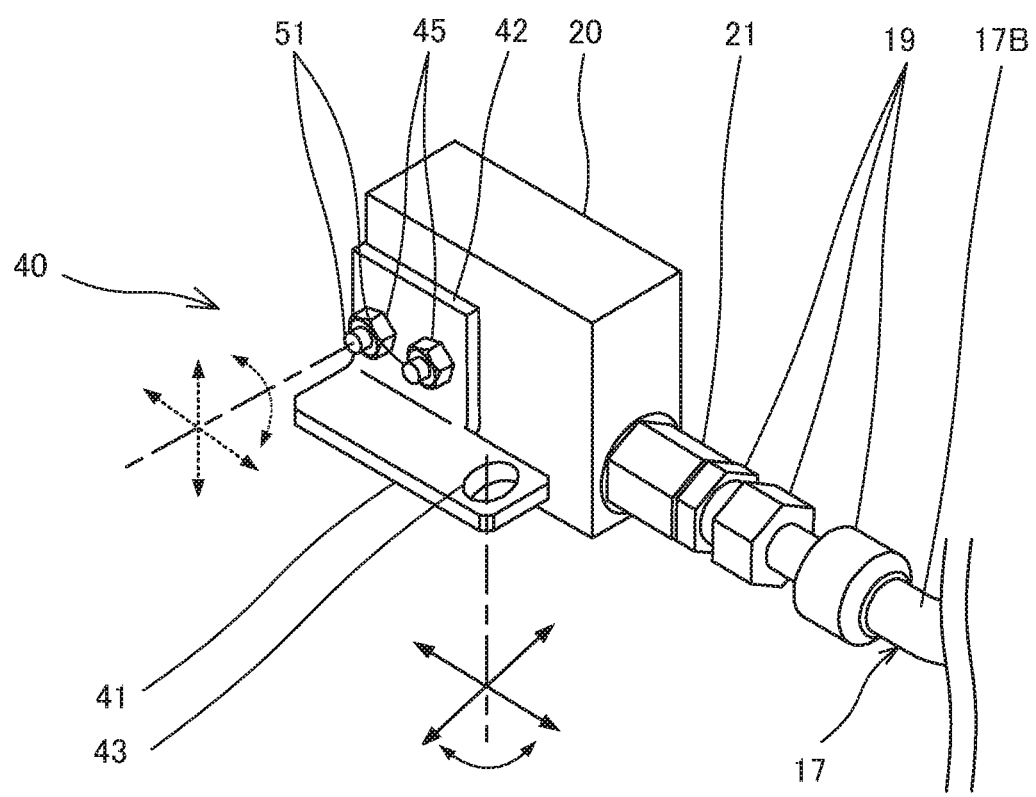
FIG. 8 is a perspective view showing a condition in which the bracket of the device mounting structure according to this embodiment of the present invention and a load maintaining mechanism are coupled to each other.

As shown by solid line arrows in FIGS. 7 and 8, therefore, in the provisional fastening condition, the bracket 40 can be moved and rotated on a parallel plane to the first connecting portion 41.

Hence, as shown in FIG. 2, by rotating the bracket 40 about the first screw member 50, a central axis of the connection port 21 of the load maintaining mechanism 20 and the central axis of the second end 17B of the pipe 17 can be made parallel to each other. Further, by moving the bracket 40 in a radial direction of the second end 17B of the pipe 17 by an amount corresponding to the length direction gap between the first screw member 50 and the first through hole 43, the respective axes of the second end 17B of the pipe 17 and the connection port 21 can be aligned. Furthermore, by moving the bracket 40 in an axial direction of the second end 17B of the pipe 17 by an amount corresponding to the width direction gap between the first screw member 50 and the first through hole 43, respective positions of the second end 17B of the pipe 17 and the connection port 21 can be aligned. Hence, by moving and rotating the bracket 40, the respective positions of the second end 17B of the pipe 17 and the connection port 21 can be aligned easily.

By forming the first through hole 43 as an elongated hole extending in a single direction, a distance by which the bracket 40 can be moved in the length direction of the elongated hole can be increased. The first through hole 43 can be formed as an elongated hole extending in any desired direction. It should be noted that the first through hole 43 is not limited to an elongated hole, and may be formed as a circular through hole having a larger diameter than the outer diameter of the first screw member 50.

As shown in FIG. 7, the bracket 40 and the coupling portion 30 are fastened to each other by passing the first screw member 50 through the first through hole 43 and then screwing the first screw member 50 into the screw hole 32 in the coupling portion 30.

As shown in FIGS. 5 and 6, two second through holes 44 are formed in the second connecting portion 42 so as to penetrate the second connecting portion 42 in a thickness direction thereof. Second screw members 51 (see FIGS. 1 and 8) for fixing the load maintaining mechanism 20 to the second connecting portion 42 are passed respectively through the second through holes 44.

Nut members 45 to which the second screw members 51 are respectively screwed after being passed through the second through holes 44 are mounted on the second connecting portion 42. As shown in FIGS. 2 and 8, the bracket 40 and the load maintaining mechanism 20 are fastened to each other by passing the second screw members 51 through the load maintaining mechanism 20 and the second through holes 44 in the bracket 40 and then screwing the second screw members 51 to the nut members 45.

Each of the second through holes 44 is a circular through hole formed to have a larger diameter than an outer diameter of the second screw member 51. Therefore, the second screw member 51 penetrates the second through hole 44 so as to leave a gap in the radial direction. Hence, in a condition (to be referred to hereafter as a "provisional fastening condition") where the second screw members 51 are passed through the second through holes 44 and screwed to the nut members 45 but the bracket 40 and the load maintaining mechanism 20 are not fully fastened, the load maintaining mechanism 20 can be moved on a parallel plane to the second connecting portion 42 by an amount corresponding to respective gaps between the second through holes 44 and the second screw members 51, as shown by dotted line arrows in FIG. 8. Further, the load maintaining mechanism 20 can be rotated about one of the second screw members 51 within a range allowed by the gap between the other second screw member 51 and the second through hole 44.

The second through holes 44 may be formed respectively as elongated holes that extend parallel to each other. In this case, an amount by which the load maintaining mechanism 20 can be moved in the length direction of the elongated holes can be increased.

Hence, the load maintaining mechanism 20 is mounted on the cylinder 11 of the hydraulic cylinder 10 by the coupling portion 30 and the bracket 40.

Next, a method of mounting the load maintaining mechanism 20 using the device mounting structure 100 will be described.

Figure 9:
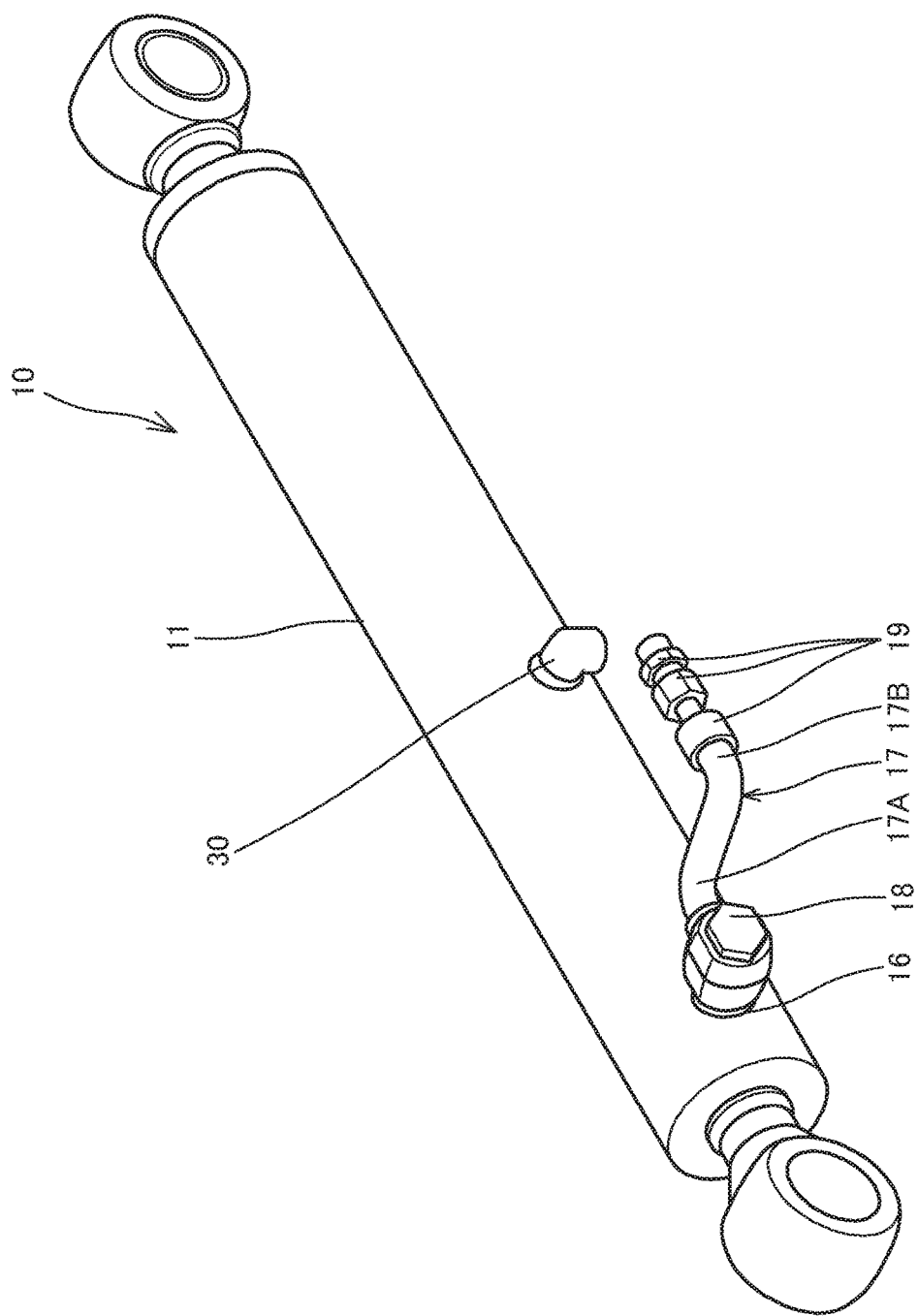
FIG. 9 is a perspective view showing the hydraulic cylinder in a condition before the load maintaining mechanism is mounted on the hydraulic cylinder.

As shown in FIG. 9, the coupling portion 30 is fixed to the cylinder 11 in advance by welding before mounting the load maintaining mechanism 20 on the hydraulic cylinder 10. Further, the first end 17A of the pipe 17 is connected to the second port 16 of the hydraulic cylinder 10. The pipe 17 is provided such that the second end 17B can be connected to the connection port 21 of the load maintaining mechanism 20 in a position close to a mounting position of the load maintaining mechanism 20.

To mount the load maintaining mechanism 20 on the hydraulic cylinder 10, first, the bracket 40 and the coupling portion 30 are coupled in the provisional fastening condition by the first screw member 50, while the load maintaining mechanism 20 and the bracket 40 are also coupled in the provisional fastening condition. In this condition, the load maintaining mechanism 20 can be moved horizontally and rotated on a parallel plane to the first connecting portion 41, as shown by the solid line arrows in FIG. 8, and can be moved horizontally and rotated on a parallel plane to the second connecting portion 42, as shown by the dotted line arrows in FIG. 8. Hence, by moving the load maintaining mechanism 20 in the provisional fastening condition, the respective positions of the connection port 21 of the load maintaining mechanism 20 and the second end 17B of the pipe 17 can be aligned. After aligning the respective positions thereof, the connection port 21 of the load maintaining mechanism 20 and the second end 17B of the pipe 17 are connected to each other. Therefore, even when the pipe 17 is an iron pipe formed in advance in a predetermined shape and then mounted on the hydraulic cylinder 10, a situation in which the respective positions of the connection port 21 of the load maintaining mechanism 20 and the second end 17B of the pipe 17 deviate from each other so that the connection port 21 and the second end 17B are connected to each other imperfectly can be avoided.

Next, once the connection port 21 of the load maintaining mechanism 20 and the second end 17B of the pipe 17 have been connected to each other, the first screw member 50 and the second screw members 51 are tightened, thereby fastening the bracket 40 to the coupling portion 30 and fastening the bracket 40 to the load maintaining mechanism 20.

As a result, as shown in FIG. 2, the load maintaining mechanism 20 can be mounted on the hydraulic cylinder 10 while avoiding an imperfect connection between the pipe 17 and the load maintaining mechanism 20.

According to the embodiment described above, following effects are obtained.

With the device mounting structure 100, the load maintaining mechanism 20 is mounted on the cylinder 11 of the hydraulic cylinder 10 by the bracket 40 and the single coupling portion 30. The bracket 40 is fastened to the coupling portion 30 by the first screw member 50 passed through the first through hole 43. Hence, when the bracket 40 is fastened provisionally to the coupling portion 30 by the first screw member 50, the bracket 40 can be rotated about the first screw member 50. Further, a gap is formed in the radial direction between the first screw member 50 and the first through hole 43. Therefore, when the bracket 40 is fastened provisionally to the coupling portion 30 by the first screw member 50, the bracket 40 can be moved relative to the hydraulic cylinder 10 by an amount corresponding to the gap between the first screw member 50 and the first through hole 43. Hence, with the single bracket 40, the load maintaining mechanism 20 can be rotated about the first screw member 50 and moved in the radial direction of the first screw member 50, and thereby positioned relative to the pipe. Accordingly, the respective positions of the connection port 21 of the load maintaining mechanism 20 and the pipe 17 can be aligned by the single bracket 40, and as a result, a mounting operation performed using the device mounting structure 100 can be improved in workability.

Furthermore, the connection port 21 of the load maintaining mechanism 20 and the second end 17B of the pipe 17 can be connected to each other after aligning the respective positions thereof, and therefore an imperfect connection between the two components can be avoided even when the pipe 17 is an iron pipe. As a result, oil leakage from a connection part between the pipe 17 and the load maintaining mechanism 20 can be prevented.

Moreover, the first through hole 43 in the bracket 40 is formed as an elongated hole extending in a single direction, making it possible to increase the distance by which the load maintaining mechanism 20 can be moved in the length direction of the elongated hole. Therefore, the respective positions of the connection port 21 of the load maintaining mechanism 20 and the pipe 17 can be aligned even when the respective positions deviate from each other by a large amount. As a result, the workability of a mounting operation performed using the device mounting structure 100 can be further improved.

Furthermore, the bracket 40 includes the first connecting portion 41 formed with the first through hole 43, and the second connecting portion 42 provided at an incline relative to the first connecting portion 41 and formed with the second through holes 44. Each second through hole 44 is formed as a through hole having a larger diameter than the outer diameter of the second screw member 51. Therefore, the load maintaining mechanism 20 can be moved on a parallel plane to the first connecting portion 41 and on a parallel plane to the second connecting portion 42. By enabling the load maintaining mechanism 20 to be moved on two planes in this manner, the respective positions of the load maintaining mechanism 20 and the pipe 17 can be aligned even when three-dimensional positional deviation occurs between the two components. As a result, the workability of a mounting operation performed using the device mounting structure 100 can be even further improved.

Next, a modified example of this embodiment will be described.

Figure 10:
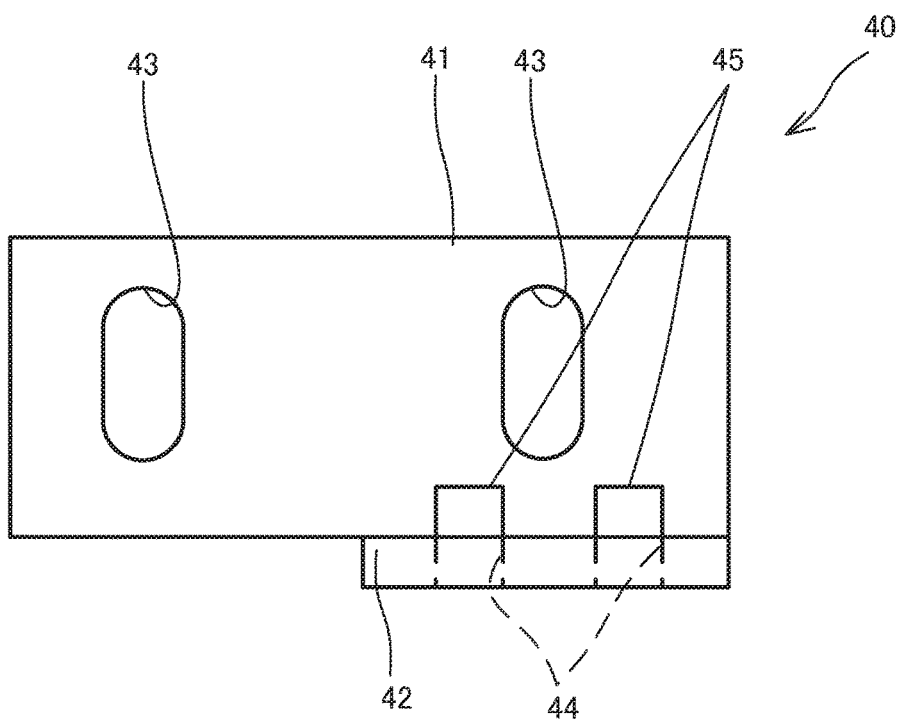
FIG. 10 is a plan view showing a modified example of the bracket of the device mounting structure according to this embodiment of the present invention, in which two first through holes are provided as elongated holes.

In the above embodiment, the bracket 40 is mounted on the hydraulic cylinder 10 via the single coupling portion 30. Instead, however, as shown in FIG. 10, the bracket 40 may include two first through holes 43 formed as mutually parallel elongated holes, and may be mounted on the hydraulic cylinder 10 via two coupling portions 30 by first screw members 50 that are passed respectively through the first through holes 43 so as to leave gaps. Likewise in this case, the bracket 40 can be rotated about one of the first screw members 50 by an amount corresponding to a gap between the other first screw member 50 and the first through hole 43.

Figure 11:
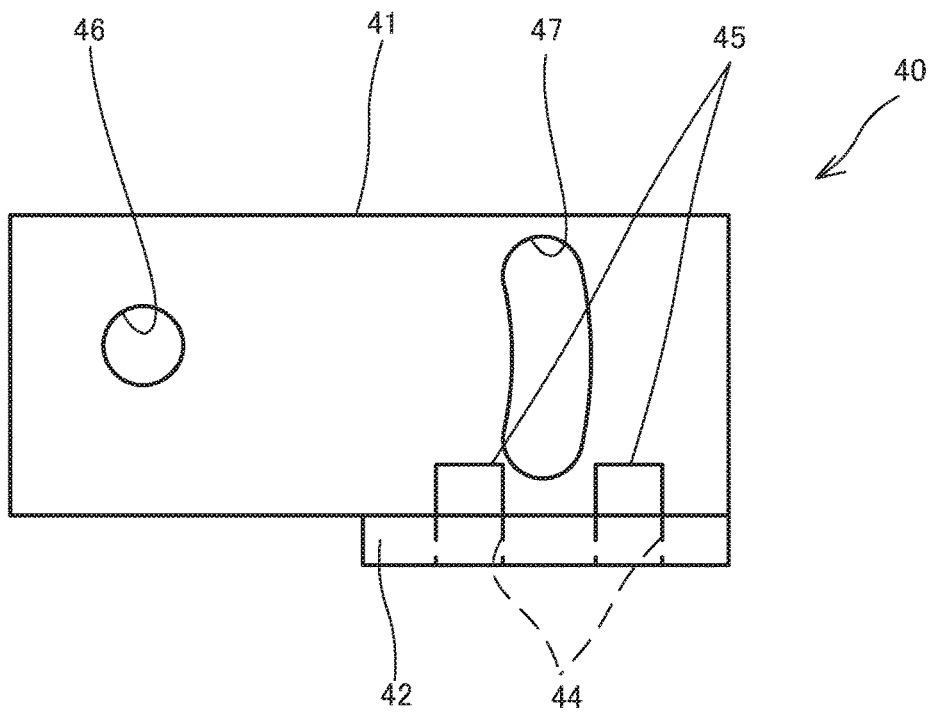
FIG. 11 is a plan view showing the modified example of the bracket of the device mounting structure according to this embodiment of the present invention, in which one of the two first through holes is an arc-shaped elongated hole.

Further, as shown in FIG. 11, in a case where two first through holes 46, 47 are provided, one of the first through holes 46 may be formed as a circular through hole, and the other first through hole 47 may be formed as an arc-shaped elongated hole. In this case, the bracket 40 can be rotated about the first screw member 50 inserted into the first through hole 46 within a range of the first through hole 47.

Furthermore, in the above embodiment, the second connecting portion 42 is provided substantially at a right angle to the first connecting portion 41. However, the incline angle between the first connecting portion 41 and the second connecting portion 42 is not limited to a right angle, and may be set at any desired angle. For example, the second connecting portion 42 may be provided at an incline relative to the first connecting portion 41 so as to extend toward the hydraulic cylinder 10 from a substantially right-angled condition. When the second connecting portion 42 is inclined so as to extend toward the hydraulic cylinder 10, the load maintaining mechanism 20 is provided closer to the hydraulic cylinder 10, making the entire configuration, including the hydraulic cylinder 10 and the load maintaining mechanism 20, more compact.

Moreover, the joint 19 that connects the connection port 21 of the load maintaining mechanism 20 to the pipe 17 maybe a ball joint. In this case, positional deviation between the connection port 21 of the load maintaining mechanism 20 and the pipe 17 can be allowed within a movable region of the ball joint.

The configuration, actions, and effects of this embodiment of the present invention will be summarized below.

The device mounting structure 100 is a device mounting structure for mounting an auxiliary device (the load maintaining mechanism 20) on the hydraulic cylinder 10, the pipe 17 for suppling and discharging the working oil to and from the hydraulic cylinder 10 being connected to the auxiliary device (the load maintaining mechanism 20) such that the working oil is led thereto, and includes the single coupling portion 30 that includes the screw hole 32 and is provided on the hydraulic cylinder 10, and the bracket 40 to which the auxiliary device (the load maintaining mechanism 20) is fixed, the bracket 40 being coupled to the coupling portion 30 via the first screw member 50 that is screwed into the screw hole 32, wherein the bracket 40 includes the first through hole 43 through which the first screw member 50 is passed so as to leave a gap in the radial direction.

With this configuration, the auxiliary device (the load maintaining mechanism 20) is mounted on the hydraulic cylinder 10 by the bracket 40 and the single coupling portion 30. The bracket 40 is coupled to the coupling portion 30 by the first screw member 50 passed through the first through hole 43. Therefore, when the bracket 40 is provisionally fastened to the coupling portion 30 by the first screw member 50, the bracket 40 can be rotated about the first screw member 50. Moreover, the radial direction gap is formed between the first screw member 50 and the first through hole 43. Therefore, when the bracket 40 is provisionally fastened to the coupling portion 30 by the first screw member 50, the bracket 40 can be moved relative to the hydraulic cylinder 10 by an amount corresponding to the gap between the first screw member 50 and the first through hole 43. Hence, the auxiliary device (the load maintaining mechanism 20) can be rotated about the first screw member 50 and moved in the radial direction of the first screw member 50 by the single bracket 40, and as a result, the respective positions of the auxiliary device (the load maintaining mechanism 20) and the pipe 17 can be aligned.

According to this configuration, the workability of a mounting operation performed using the device mounting structure 100 can be improved.

Further, in the device mounting structure 100, the first through hole 43 is an elongated hole extending in a single direction.

With this configuration, the distance by which the auxiliary device (the load maintaining mechanism 20) can be moved in the length direction of the elongated hole can be increased. As a result, the respective positions of the connection port 21 of the auxiliary device (the load maintaining mechanism 20) and the pipe 17 can be aligned even when the respective positions deviate from each other by a large amount.

According to this configuration, the workability of a mounting operation performed using the device mounting structure 100 can be further improved.

Furthermore, in the device mounting structure 100, the bracket 40 includes the flat plate-shaped first connecting portion 41 in which the first through hole 43 is provided so as to penetrate the first connecting portion 41 in the thickness direction thereof, and the flat plate-shaped second connecting portion 42 that is provided at an incline relative to the first connecting portion 41 and includes the second through holes 44 through which the second screw members 51 for fastening the auxiliary device (the load maintaining mechanism 20) are passed so as to leave gaps in the radial direction.

With this configuration, the auxiliary device (the load maintaining mechanism 20) can be moved on a parallel plane to the first connecting portion 41 and on a parallel plane to the second connecting portion 42. As a result, the respective positions of the connection port 21 of the auxiliary device (the load maintaining mechanism 20) and the pipe 17 can be aligned even when three-dimensional positional deviation occurs between the two components.

According to this configuration, the workability of a mounting operation performed using the device mounting structure 100 can be even further improved.

Moreover, in the device mounting structure 100, the auxiliary device is the load maintaining mechanism 20 for maintaining the load pressure exerted on the hydraulic cylinder 10 by the boom 1 that is driven by the hydraulic cylinder.

Embodiments of this invention were described above, but the above embodiments are merely examples of applications of this invention, and the technical scope of this invention is not limited to the specific constitutions of the above embodiments.

In the above embodiment, a case in which the auxiliary device is the load maintaining mechanism 20 was described. However, the auxiliary device may be any device to which the pipe 17 that is configured to supply and discharge the working oil to and from the hydraulic cylinder 10 is connected. For example, the auxiliary device may be a manifold that gathers or distributes the working oil supplied to and discharged from the hydraulic cylinder 10.

Further, in the above embodiment, the coupling portion 30 is provided as a separate component to the hydraulic cylinder 10, and fixed to the cylinder 11 by welding. Instead, however, the through hole 32 may be provided directly in the cylinder 11 such that the cylinder 11 and the coupling portion 30 may be formed integrally.

This application claims priority based on Japanese Patent Application No. 2014-231921 filed with the Japan Patent Office on Nov. 14, 2014, the entire contents of which are incorporated into this specification.

The invention claimed is:

1. A device mounting structure for mounting an auxiliary device on a fluid pressure cylinder, a pipe for suppling and discharging a working fluid to and from the fluid pressure cylinder being connected to the auxiliary device, the device mounting structure comprising:
   a single coupling portion that includes a screw hole, the single coupling portion being connectable to the fluid pressure cylinder; and
   a bracket to which the auxiliary device is fixable, the bracket being coupled to the coupling portion via a first screw member that is screwed into the screw hole, wherein
   the bracket includes a first through hole through which the first screw member is passed, a gap being formed between an outer periphery of the first screw member and an inner periphery of the first through hole in a radial direction, to allow the bracket to be moved by an amount corresponding to the gap.

2. The device mounting structure as defined in claim 1, wherein the coupling portion has only one screw hole, and the first through hole is an elongated hole extending in a single direction.

3. The device mounting structure as defined in claim 1, wherein the bracket includes:
   a flat plate-shaped first connecting portion in which the first through hole is provided so as to penetrate the first connecting portion in a thickness direction thereof; and
   a flat plate-shaped second connecting portion that is provided at an incline relative to the first connecting portion and includes a second through hole through which a second screw member for fastening the auxiliary device is passed so as to leave a gap in a radial direction.

4. The device mounting structure as defined in claim 1, wherein the auxiliary device is a load maintaining mechanism for maintaining a load pressure exerted on the fluid pressure cylinder by a load that is driven by the fluid pressure cylinder.

5. The device mounting structure as defined in claim 1, wherein in a provisional fastening condition where the first screw member is passed through the first through hole and screwed into the screw hole but the bracket and the coupling portion are not fully fastened together, the bracket is movable in a length direction and a width direction of the first through hole.

6. The device mounting structure as defined in claim 1, wherein the first through hole has a diameter that is greater than a diameter of the first screw member, to allow the first screw member to be positioned in a plurality of different locations within the bracket.

* * * * *